No. 778,565. PATENTED DEC. 27, 1904.
F. J. & H. G. CARL.
WINDOW.
APPLICATION FILED JAN. 21, 1904.
2 SHEETS—SHEET 1.
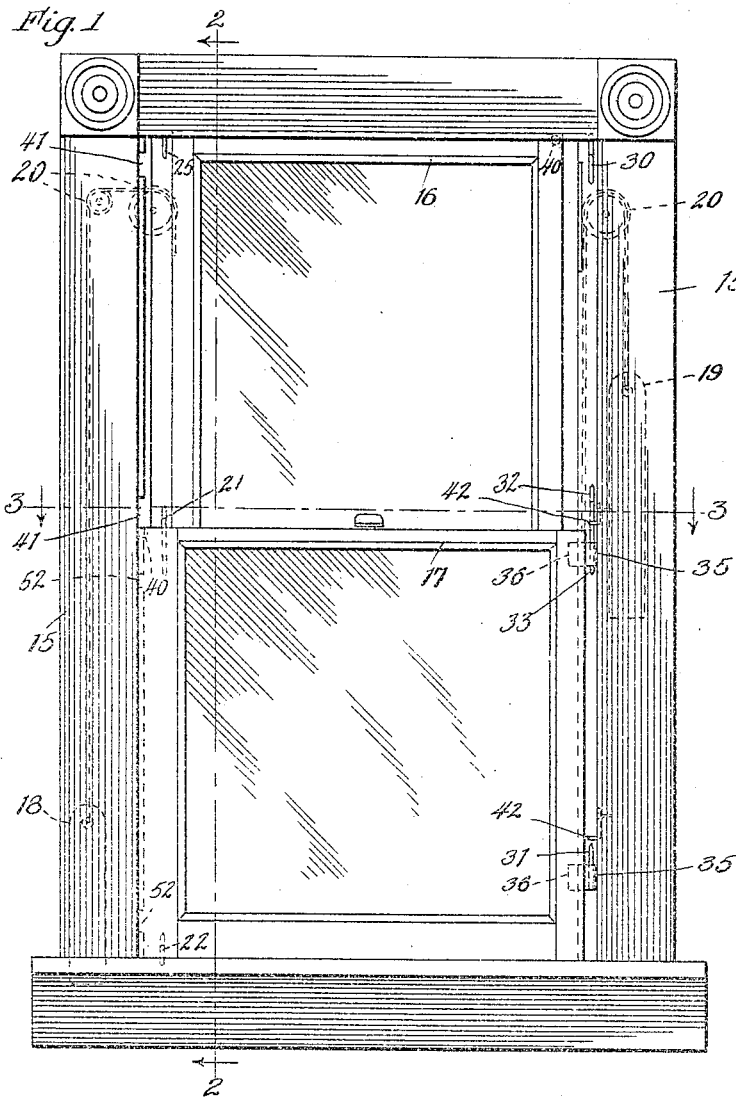
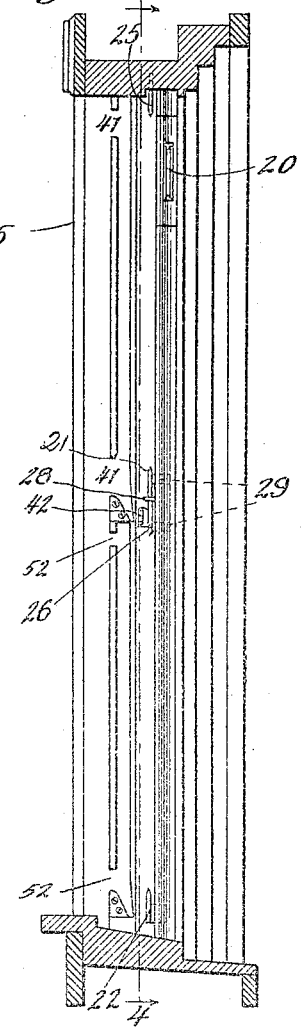
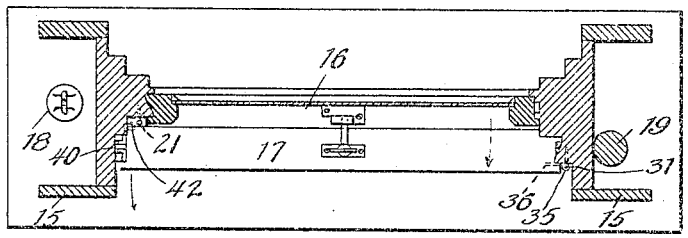
Witnesses:
Wm. Geiger
H. W. Munday
Inventors:
Franz J. Carl
Hermann G. Carl
By Munday, Evarts & Adcock
Attorneys No. 778,565. PATENTED DEC. 27, 1904.
F. J. & H. G. CARL.
WINDOW.
APPLICATION FILED JAN. 21, 1904.
2 SHEETS—SHEET 2.
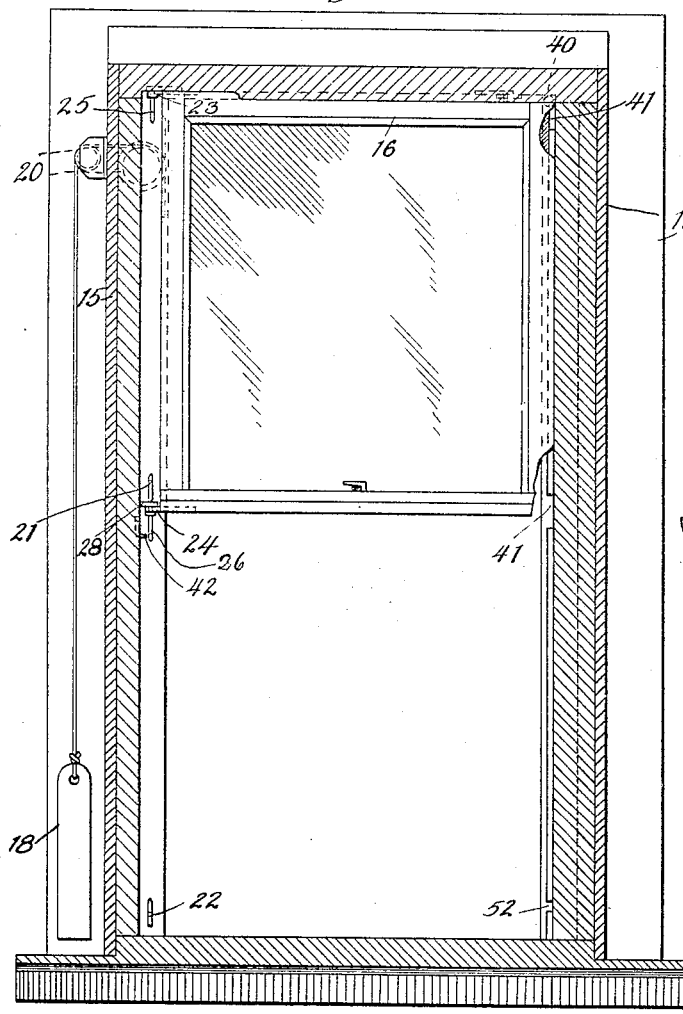
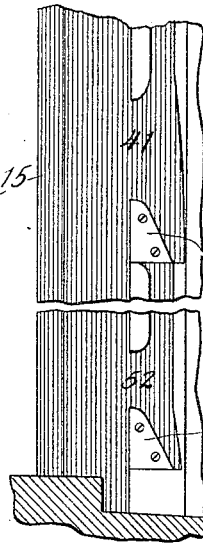
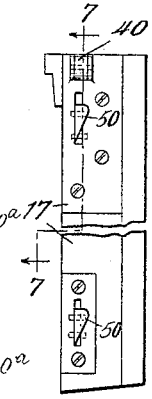
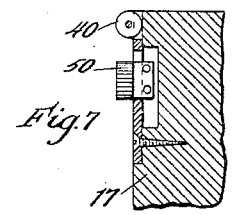
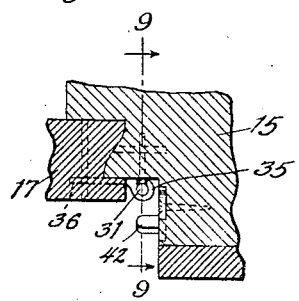
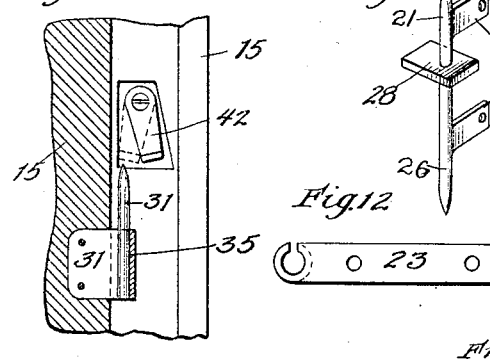
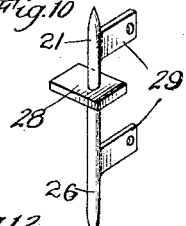
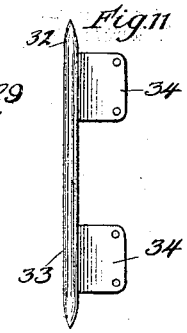
Witnesses
Wm. Geiger
H. W. Munday
Inventors:
Franz J. Carl
Hermann G. Carl
By Munday, Evarts & Adcock
Attorneys No. 778,565.

Patented December 27, 1904.

UNITED STATES PATENT OFFICE.

FRANZ J. CARL AND HERMANN G. CARL, OF CHICAGO, ILLINOIS.

WINDOW.

SPECIFICATION forming part of Letters Patent No. 778,565, dated December 27, 1904.

Application filed January 21, 1904. Serial No. 189,969.

*To all whom it may concern:*

Be it known that we, FRANZ J. CARL, a citizen of the United States, and HERMANN G. CARL, a subject of the Emperor of Germany, both residing in the city of Chicago, in the county of Cook and State of Illinois, have invented a new and useful Improvement in Windows, of which the following is a specification.

This invention relates to the manner of hanging window-sashes in dwellings and other buildings, and is an improvement upon the construction shown in the patent to us, No. 471,457, dated October 13, 1903.

Our main object in the present improvement has been to devise a construction which will permit both sashes to be swung open not only in their lowermost position, but also in their uppermost one. The latter is important more especially in warm weather, when the users desire that the window shall be entirely open, because this result may be obtained with the sash elevated where they are out of danger and out of the reach of children who might break the glass.

The invention also embodies some other features of invention which are fully set forth in the description below and illustrated in the accompanying drawings, in which—

Figure 1 is an elevation of a window embodying our invention. Fig. 2 is a section of the same on line 2 2 of Fig. 1, both sashes being omitted. Fig. 3 is a section on the line 3 3 of Fig. 1. Fig. 4 is a section on the line 4 4 of Fig. 2. Fig. 5 is a partial edge view of the window-frame, and Fig. 6 is a partial edge view of the lower sash. Fig. 7 is a section on line 7 7 of Fig. 6. Fig. 8 is a detail horizontal section. Fig. 9 is a section on the line 9 9 of Fig. 8. Figs. 10 and 11 are detail views of portions of the hinges. Fig. 12 is a plan of one of the hinged plates carried by the upper sash.

In the drawings, 15 represents the window-frame, 16 the upper sash, and 17 the lower sash. Both the latter are provided with counterbalanced weights, that of the upper sash being shown at 18 and that of the lower one at 19, the cords 50 passing over pulleys 20. But one weight is used with either sash in order that one side of each may be free to swing without detaching any sash-cord. Each sash is also provided on one side with hinging devices, as indicated. In the case of the upper sash sockets or eyes are formed on the ends of plates 23 and 24, and are secured, respectively, to the top rail and the meeting-rail, as seen more particularly at Fig. 4, and the window-frame is provided with a pivot 25, adapted to enter the socket of plate 23 when the sash is raised to its uppermost position and with a second pivot 26 near the vertical center of the frame adapted to enter the socket of plate 24 when the sash is in said position. When the upper sash is lowered to its lower position, the plate 23 sets over the pivot 21 and plate 24 engages with the pivot 22, the upper sash being thus held on pivots in both of its extreme positions, and is thus enabled to be swung open not only when it is lowered, but when it is in its normal or proper position. The pivots 21 and 26 may have a stop 28 and be attached to the window-frame by wings 29. The stop-plate limits the downward movement of the sash, so that the meeting-rail will not interfere with the bottom of the window-frame when the sash is swung in its lower position. These hinging devices are all located, it will be noted, on the same side of the sash with the counterbalance-weight 18, and also that the plates 23 and 24 are slotted at one side of the pivot-openings in them, so that they may pass the supports 29, by which the pivots 21 and 26 are carried. In the case of the lower sash an upper pivot is shown at 30, a bottom pivot at 31, and central pivots at 32 and 33. These pivots are all secured in the window-frame by wings 34, the central pivot having two of such wings and the lower sash is provided with eyes 35, adapted to engage said pivots and attached to the sash by a strap 36. The eye has an opening in one side, so as to permit it to pass the supports 34. The lower sash is normally in engagement with the pivots 31 and 33 and moves into engagement when raised with pivots 30 and 32, and it can be swung in either its lower or its upper position.

Both the sashes are provided upon their swinging edges with antifriction-rollers 40, as in our said patent, and all of the guide-slots in the window-frame are cut away, as at 41, to permit the rollers to move out of the guide-slots in the frame when the sash is swung open. Both sashes must be moved vertically a short distance when they are to be swung from their normal positions in order to enable them to clear the window-frame, and in order that the window may be positioned at the right point, so that the rollers 40 will move out of the slots 41, I provide in the case of each sash movable catches 42 upon the side frame, which can be thrown into operative position by the finger at will. These catches are adapted to intercept the passing of the parts of the hinges carried by the sash and prevent them from moving too far. We also prefer to provide both the sashes with wedging devices 50, adapted to contact with stationary wedging devices $50^a$ on the side of the window-frame. These devices prevent the sashes from rattling and force them into close contact with the sides of the grooves in which they move. The wedging devices are so located as not to interfere with the swinging of the sashes, but openings 52 are formed in the inner walls of the slots in which the sashes move, so that the cams or wedges 50 may not prevent the swinging of the sashes.

We claim—

1. The combination in a window of sliding and swinging upper and lower sashes, the sashes carrying hinge sockets or plates and stationary hinge-pivots being provided upon the frame engaging said sockets or plates in both the upper and the lower positions of the sashes.

2. The combination in a window of sliding and swinging upper and lower sashes, the sashes carrying hinge sockets or plates, and stationary hinge-pivots being provided upon the frame engaging said sockets or plates in both the upper and the lower positions of the sash, said sockets and pivots being located upon the same side of the sash with the supporting-weight thereof.

3. The combination in a window of sliding and swinging upper and lower sashes, the sashes carrying hinge sockets or plates, and stationary hinge-pivots being provided upon the frame engaging said sockets or plates in both the upper and the lower positions of the sashes, said sockets and pivots being located upon the same side of the sash with the supporting-weight thereof, and upon the opposite sides of the two sashes.

4. The combination with the sliding and swinging sash and the window-frame, of wedging devices 50 on the sash and corresponding devices $50^a$ on the frame, serving to press the sash closely against the frame.

FRANZ J. CARL.
HERMANN G. CARL.

Witnesses:
H. M. MUNDAY,
EDW. S. EVARTS.